United States Patent
Takahashi et al.

(10) Patent No.: US 9,328,428 B2
(45) Date of Patent: *May 3, 2016

(54) DEVICE FOR REMOVING FOREIGN MATERIAL FROM PROCESSING TANK

(75) Inventors: Kazuaki Takahashi, Iruma (JP); Shunsuke Watanabe, Tokyo (JP)

(73) Assignees: INDUSTRIA CO., LTD., Iruma-Shi (JP); HONDA MOTOR CO., LTD., Tokyo (JP)

( * ) Notice: Subject to any disclaimer, the term of this patent is extended or adjusted under 35 U.S.C. 154(b) by 1445 days.

This patent is subject to a terminal disclaimer.

(21) Appl. No.: 12/864,152

(22) PCT Filed: Jan. 21, 2009

(86) PCT No.: PCT/JP2009/000209
§ 371 (c)(1),
(2), (4) Date: Oct. 18, 2010

(87) PCT Pub. No.: WO2009/093448
PCT Pub. Date: Jul. 30, 2009

(65) Prior Publication Data
US 2011/0048476 A1     Mar. 3, 2011

(30) Foreign Application Priority Data
Jan. 22, 2008 (JP) .................. 2008-011648

(51) Int. Cl.
*B01D 21/00* (2006.01)
*C25D 21/18* (2006.01)
*B01D 21/24* (2006.01)
(Continued)

(52) U.S. Cl.
CPC ........... *C25D 21/18* (2013.01); *B01D 21/0012* (2013.01); *B01D 21/245* (2013.01); *B01D 21/2488* (2013.01); *B08B 3/041* (2013.01); *B08B 3/14* (2013.01); *C25D 17/02* (2013.01); *C25D 21/04* (2013.01)

(58) Field of Classification Search
CPC ..................................................... B01D 21/245
See application file for complete search history.

(56) References Cited

U.S. PATENT DOCUMENTS 5,135,579 A * 8/1992 Goettl ............................ 134/10
8,409,416 B2 * 4/2013 Takahashi et al. ............ 204/623

FOREIGN PATENT DOCUMENTS

| JP | 57-121676 | 7/1982 |
|---|---|---|
| JP | 1-106573 | 7/1989 |

(Continued)

OTHER PUBLICATIONS

English Machine Translation of JP11-123341.*

*Primary Examiner* — Michael Kornakov
*Assistant Examiner* — Jason Riggleman
(74) *Attorney, Agent, or Firm* — Rankin, Hill & Clark LLP

(57) ABSTRACT

A device for removing, from a processing tank, foreign material that becomes detached from a work when the work is immersed in a processing liquid held in a processing tank. The device includes a grooved part having a plurality of concave and convex shapes formed along a work-conveying direction on at least the bottom surface of the processing tank, a hopper provided in the processing tank, a processing liquid supply pipe which supplies the processing liquid circulating through the hopper to the processing tank, a plurality of branch pipes branched from the processing liquid supply pipe and arranged on ridges of the grooved part, and processing liquid discharge nozzles provided so as to face the hopper at sections of the branch pipes opposing bottom parts of the grooved part.

6 Claims, 12 Drawing Sheets

(51) Int. Cl.
    *B08B 3/04*     (2006.01)
    *B08B 3/14*     (2006.01)
    *C25D 17/02*     (2006.01)
    *C25D 21/04*     (2006.01)

(56) References Cited

FOREIGN PATENT DOCUMENTS

| | | | | |
|---|---|---|---|---|
| JP | 1-147255 | 10/1989 | | |
| JP | 06-272091 | 9/1994 | | |
| JP | 11-123341 | * 5/1999 | ................ | B03B 5/68 |
| JP | 2001-129313 | * 5/2001 | ............ | B01D 21/24 |
| JP | 2002-159803 | 6/2002 | | |
| JP | 2002-239305 | 8/2002 | | |
| JP | 2002-282609 | 10/2002 | | |
| JP | 2002-292209 | 10/2002 | | |
| JP | 2003-117458 | 4/2003 | | |
| JP | 2005-111383 | 4/2005 | | |

\* cited by examiner

DEVICE FOR REMOVING FOREIGN MATERIAL FROM PROCESSING TANK

TECHNICAL FIELD

The present invention relates to a device for removing, from a processing tank, foreign material that becomes detached from a work when the work is immersed in a processing liquid held in the processing tank.

BACKGROUND ART

Foreign materials that remain adhered to a processed object such as an automotive body (body-in-white) subjected to a weld process include foreign materials such as iron powder and anti-corrosive oil adhered to respective press-molded parts prior to the weld process and foreign materials such as spatter adhered during the weld process. Therefore, before subjecting the automotive body to a paint process, the automotive body is placed under a shower to clean off foreign material adhered thereto and is subsequently subjected to preprocessing such as a degreasing process, a surface conditioning process, and a chemical conversion process. The preprocessed automotive body then proceeds to an electrodeposition process, a middle coat process, and a finish coat process.

A large number of processing tanks (dip tanks) are involved in preprocessing. Foreign materials introduced into a processing tank adhering to an object to be processed, in particular, foreign materials with a high specific gravity such as iron powder and spatter, settle and accumulate at the bottom part of the processing tank. In addition, an electrodeposition process also causes sedimentable pigment components of an electrodeposition paint to settle and solidify in a processing tank over a long period of use. Such iron powder, spatter, solidified pigment component and the like are churned up by a convective flow of the processing liquid and by an in-tank movement of the processed object, problematically causing iron powder, spatter, solidified pigment component and the like to re-adhere to the processed object.

A known method of removing such foreign material accumulated in a processing tank involves creating a circulatory flow in the processing tank, providing a circulatory path intake at a location on a bottom part of the processing tank where a largest amount of foreign material is retained by the circulatory flow, suctioning the retained foreign material together with processing liquid by a pump from the intake, and capturing and removing the foreign material with a filter (for example, refer to Patent Document 1).

In addition, a device is known in which a magnetic sheet is transferably arranged across an inlet, a bottom part, and an outlet of a processing tank to have iron powder settled on the bottom part of the processing tank adhere to the magnetic sheet, and the magnetic sheet is subsequently moved so that the iron powder is scraped off of the magnetic sheet by a scraper at the outside of the processing tank (for example, refer to Patent Document 2).

Patent Document 1: Japanese Patent Laid-Open No. 06-272091
Patent Document 2: Japanese Patent Laid-Open No. 2003-117458

DISCLOSURE OF THE INVENTION

Problems To Be Solved By the Invention

With a technique such as that described in Patent Document 1, since iron powder, spatter, solidified pigment component and the like which have relatively high specific gravities are not carried to the retention location by the circulatory flow and instead settle and accumulate at the bottom part of the processing tank, the problem cannot be solved.

In addition, with a technique such as that described in Patent Document 2, while magnetic foreign material such as iron powder can be collected, other foreign material settled onto the magnetic sheet are churned up by movements of the magnetic sheet and problematically adhere to the processed object in the processing tank.

The present invention has been made in consideration of such problems found in conventional art, and an object of the present invention is to provide a device capable of reliably removing foreign material from the inside of a processing tank.

Means For Solving the Problems

In order to solve the problems described above, a first aspect of the present invention is a device for removing from a processing tank, foreign material that becomes detached from a work when the work is immersed in a processing liquid held in a processing tank, the device including: a grooved part having a plurality of concave and convex shapes formed along a work-conveying direction on at least a bottom surface of the processing tank; a foreign material accumulation part provided in the processing tank; a processing liquid supply pipe which supplies the processing liquid circulating through the foreign material accumulation part to the processing tank; a plurality of branch pipes branched from the processing liquid supply pipe and arranged on convexities of the grooved part; and processing liquid discharge nozzles provided so as to face the foreign material accumulation part at sections of the branch pipes opposing the center of concavities of the grooved part.

A second aspect of the present invention is the device for removing foreign material from a processing tank according to the first aspect of the present invention, wherein the grooved part is formed by arranging, side by side, steel plate members having gutter shapes, the concavities are bottom parts of the steel plate members, and the convexities are ridges of the steel plate members.

A third aspect of the present invention is the device for removing foreign material from a processing tank according to the first aspect of the present invention, wherein the grooved part is formed by arranging, side by side, steel plate members having serrated shapes, the concavities are valleys of the steel plate members, and the convexities are ridges of the steel plate members.

A fourth aspect of the present invention is the device for removing foreign material from a processing tank according to any one of the first, second, and third aspects of the present invention, wherein the foreign material accumulation part is one of a hopper provided on an end of the grooved part, the bottom parts of the steel plate members, and the valleys of the steel plate members.

Advantages of the Invention

According to the first aspect of the present invention, foreign material with a relatively high specific gravity which naturally tends to settle and accumulate in the processing tank is carried by a flow of processing liquid ejected from the processing liquid discharge nozzle and converges in the vicinity of convexities of the grooved part, consecutively flows toward the foreign material accumulation part, and is ultimately collected by the foreign material accumulation part.

According to the second aspect of the present invention, the concavities and convexities of the grooved part can be readily formed using steel plate members having gutter shapes, and a flow of the processing liquid can be created which can cause the foreign material to flow toward the foreign material accumulation part while preventing settling and accumulation thereof.

According to the third aspect of the present invention, the concavities and convexities of the grooved part can be readily formed using steel plate members having serrated shapes, and a flow of the processing liquid can be created which can cause the foreign material to flow toward the foreign material accumulation part while preventing settling and accumulation thereof.

According to the fourth aspect of the present invention, by configuring the foreign material accumulation part as one of a hopper provided on an end of the grooved part, the bottom parts of the steel plate members, or the valleys of the steel plate members, foreign material can be reliably collected.

Figure 1:
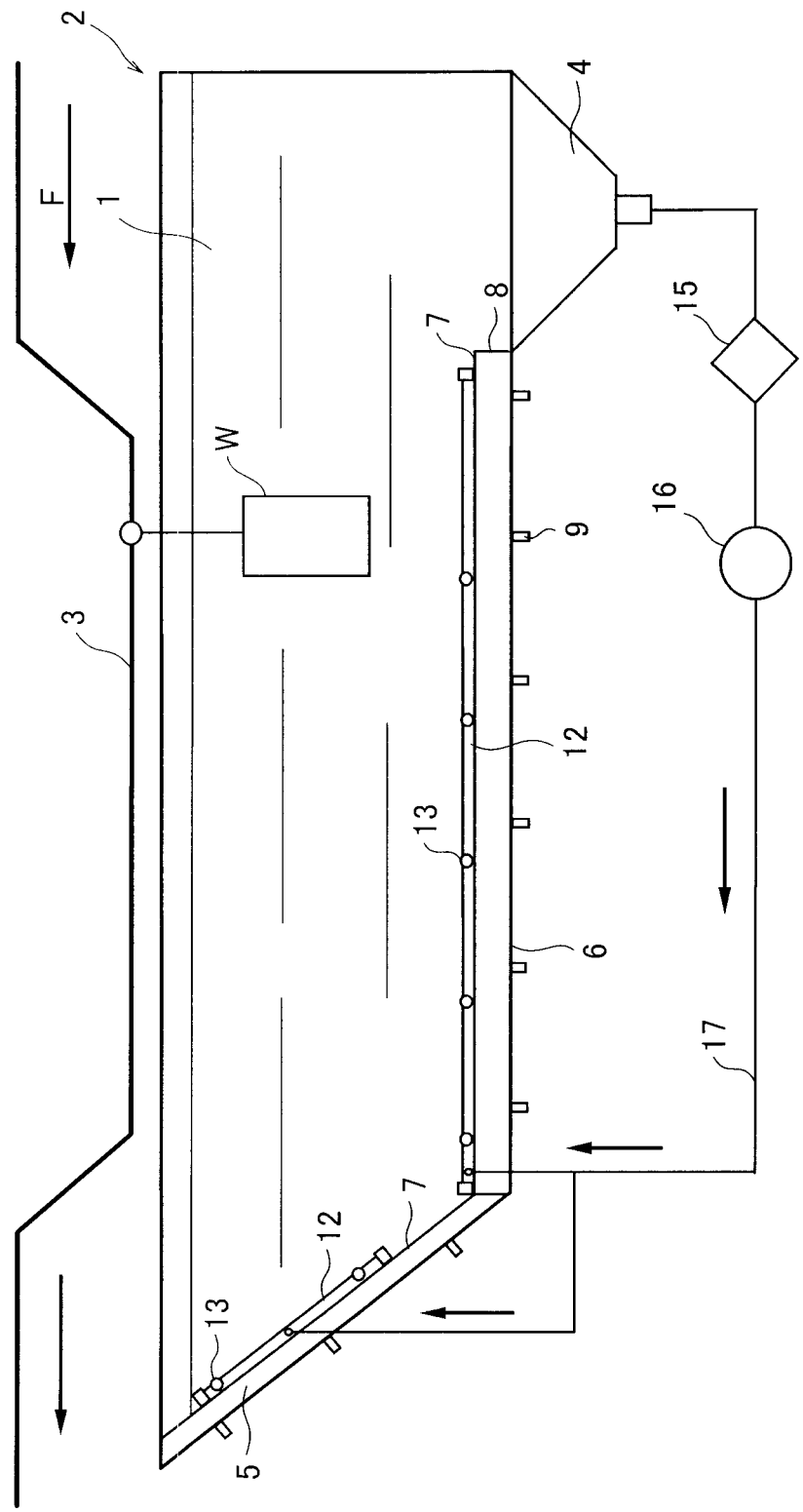
FIG. 1 is an explanatory diagram of a schematic configuration of a processing tank including a first embodiment of a device for removing foreign material from a processing tank according to the present invention.

DESCRIPTION OF SYMBOLS 1 processing liquid
2 processing tank
3 conveyor
4 hopper
5 inclined part
6 bottom surface
7,27 grooved part
7a, 27a edge part
8,28 steel plate member
9,29 reinforcing member
10a concavity (bottom part)
10b, 30b convexity (ridge)
12 processing liquid supply pipe
13 branch pipe
14 processing liquid discharge nozzle
15 filter
16 circulation pump
17 processing liquid circulation pipe
30a concavity (valley)
31,41 foreign material accumulation part
32,42 discharge pipe
W work

BEST MODE FOR CARRYING OUT THE INVENTION

Figure 2:
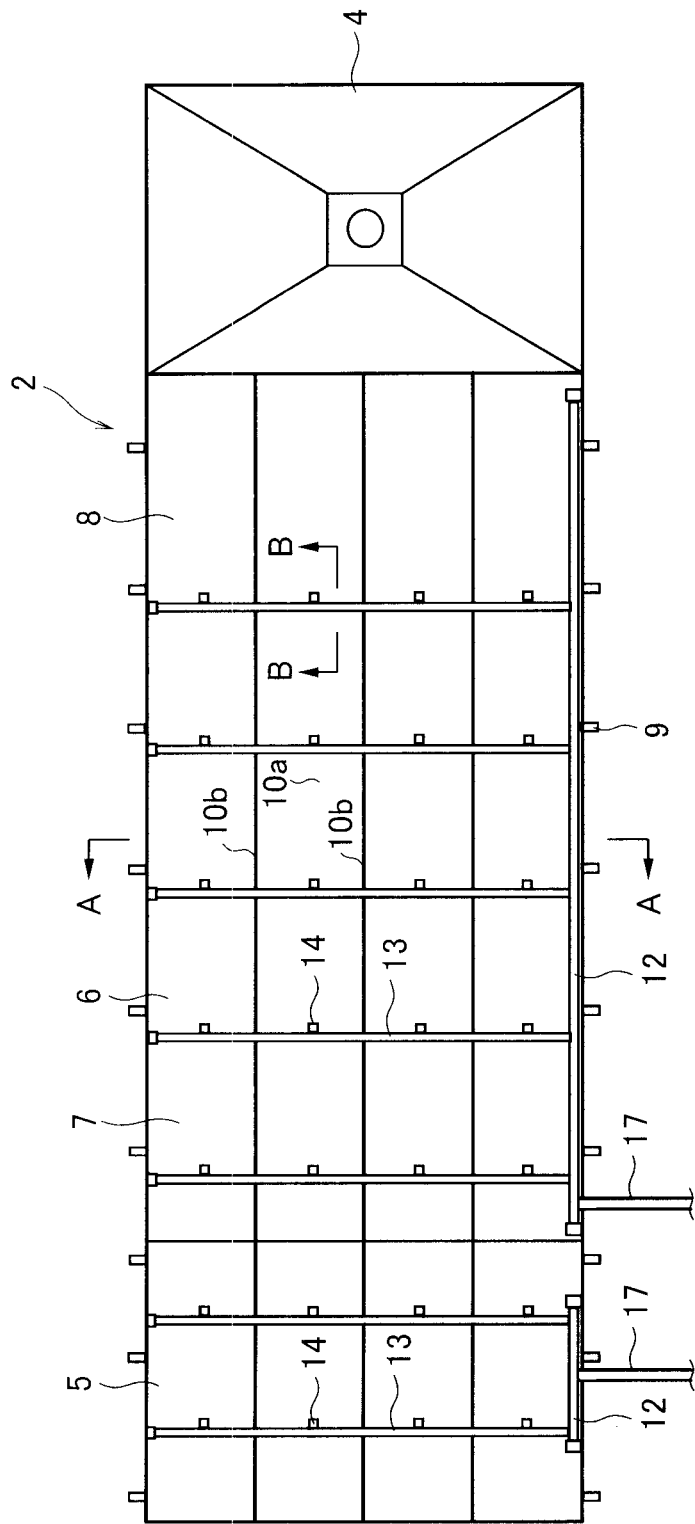
FIG. 2 is a plan view of the processing tank including the first embodiment of a device for removing foreign material from a processing tank according to the present invention.
Figure 3:
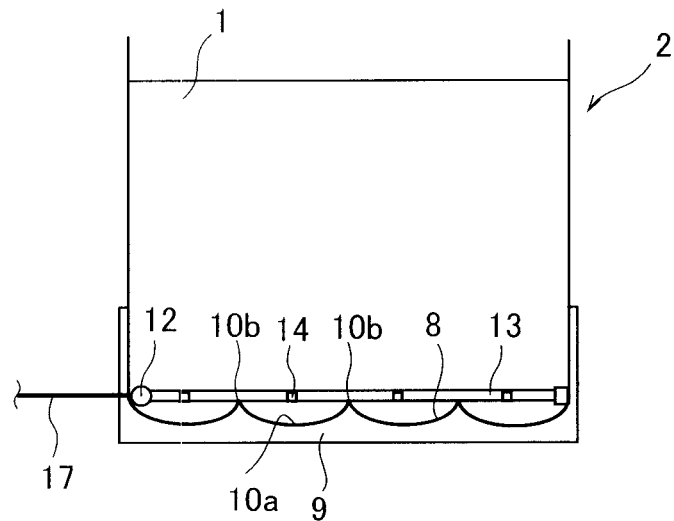
FIG. 3 is a cross-sectional fragmentary view taken along A-A in FIG. 2.
Figure 4:
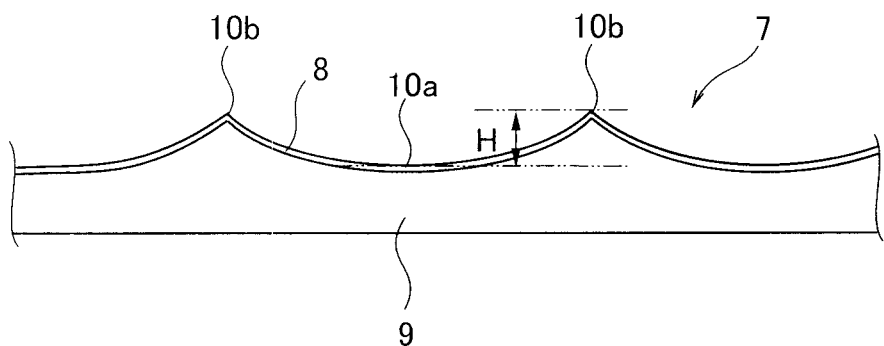
FIG. 4 is an enlarged view of a substantial part of FIG. 3.
Figure 5:
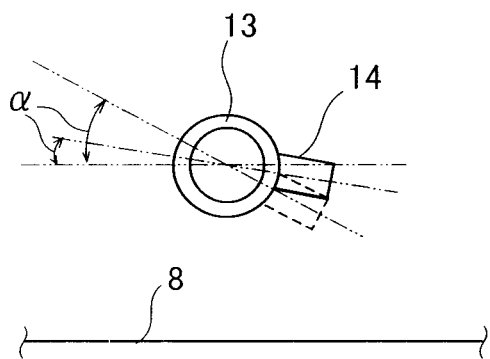
FIG. 5 is an enlarged cross-sectional fragmentary view taken along B-B in FIG. 2.
Figure 6:
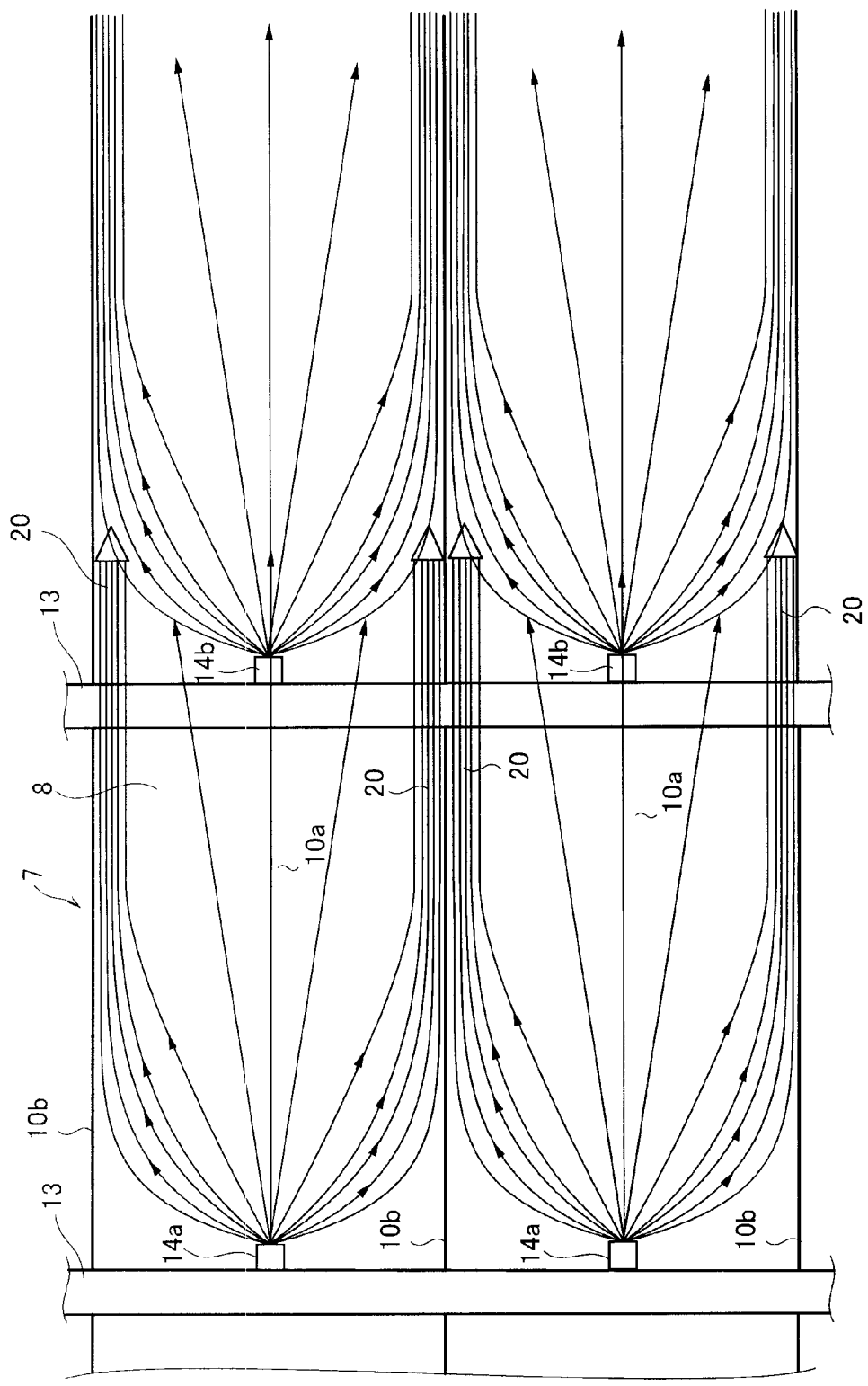
FIG. 6 is an explanatory diagram of operations of the first embodiment.

Hereinafter, embodiments of the present invention will be described with reference to the accompanying drawings. In the drawings: FIG. 1 is an explanatory diagram of a schematic configuration of a processing tank including a first embodiment of a device for removing foreign material from a processing tank according to the present invention; FIG. 2 is a plan view of the same; FIG. 3 is a cross-sectional fragmentary view taken along A-A in FIG. 2; FIG. 4 is an enlarged view of a substantial part of FIG. 3; FIG. 5 is an enlarged cross-sectional fragmentary view taken along B-B in FIG. 2; and FIG. 6 is an explanatory diagram of operations of the first embodiment.

As illustrated in FIGS. 1 and 2, a first embodiment of a device for removing foreign material from a processing tank according to the present invention is provided in a processing tank 2 in which a work W is immersed in a processing liquid 1 to be subjected to processes such as degreasing, cleaning, and electrodeposition. A conveyor 3 for suspending and immersing the work W in the processing liquid 1 while conveying the work W in a direction indicated by an arrow F (work-conveying direction) is installed above the processing tank 2. A hopper 4 for collecting foreign material in the processing tank 2 is arranged on the work-receiving side of the processing tank 2. In addition, an inclined part 5 is formed on the work-discharging side of the processing tank 2. A grooved part 7 having a plurality of concave and convex shapes is formed along the work-conveying direction from the inclined part 5 to a bottom surface 6 of the processing tank 2.

As illustrated in FIG. 3, the grooved part 7 is formed by welding and bonding together a plurality of steel plate members 8 having a plurality of concave and convex shapes (a shape in which gutter shapes are arranged side by side) manufactured by press-molding, and reinforcing an outer frame of the welded and bonded steel plate members 8 with a reinforcing member 9. Concavities 10a of the grooved part 7 are bottom parts of the steel plate members 8, and convexities 10b of the grooved part 7 are ridges of the steel plate members 8. In addition, as illustrated in FIG. 4, a cross section of the steel plate member 8 is formed by a portion of an elliptical shape whose major axis is positioned in a width direction of the processing tank 2 and whose minor axis is positioned in a height direction of the processing tank 2. The elliptical shape of the steel plate member 8 applied in the present invention preferably has a major axis-to-minor axis ratio ranging from 1:1 to 8:1. Furthermore, a height H of the steel plate member 8 is equal to or shorter than one half of the minor axis.

Processing liquid supply pipes 12 are respectively arranged on work-conveying direction sides of the inclined part 5 and the bottom surface 6 of the processing tank 2. A plurality of branch pipes 13 branched from the processing liquid supply pipe 12 extends above the grooved part 7 at regular intervals in a direction perpendicular to the work-conveying direction so as to abut the ridges 10b of the grooved part 7. In addition, processing liquid discharge nozzles 14 facing the hopper 4 are mounted at sections of the branch pipes 13 opposing the center of the bottom parts 10a of the grooved part 7.

As illustrated in FIG. 5, the processing liquid discharge nozzle 14 is installed in a direction opposite to the work-conveying direction and with an elevation angle α ranging from 10° to 60° (10°≤α≤60°) with respect to the bottom parts 10a of the grooved part 7. In addition, one end of a processing liquid circulation pipe 17 is connected to the hopper 4 via a filter 15 and a circulation pump 16, while the other end of the processing liquid circulation pipe 17 is connected to the processing liquid supply pipe 12.

A description of operations of the first embodiment of the device for removing foreign material from a processing tank according to the present invention configured as described above will now be given. As illustrated in FIG. 6, the processing liquid 1 ejected from a processing liquid discharge nozzle 14a of the branch pipe 13 positioned on a downstream-side in the work-conveying direction initially flows from the center of each bottom part 10a of the grooved part 7 to ridges 10b on both sides of the center of each bottom part 10a, then converges in a vicinity of the ridges 10b on both sides, becomes a strong flow 20 along the ridges 10b, and further flows toward the hopper 4.

The processing liquid 1 that flows toward the hopper 4 joins a flow of the processing liquid 1 ejected from a processing liquid discharge nozzle 14b of the branch pipe 13 positioned on the upstream-side in the work-conveying direction and further flows toward the hopper 4. At this point, foreign material with a relatively high specific gravity which naturally tends to settle and accumulate on the inclined part 5 and the bottom surface 6 of the processing tank 2 is carried by the flow of the processing liquid 1 ejected from the processing liquid discharge nozzle 14 and converges in the vicinity of the ridges 10b, consecutively flows toward the hopper 4, and is ultimately collected inside the hopper 4.

Next, foreign material collected in the hopper 4 is removed by the filter 15 when the processing liquid 1 suctioned by the circulation pump 16 returns to the processing tank 2 through the processing liquid circulation pipe 17. The processing liquid 1 with foreign material removed is once again ejected from the processing liquid discharge nozzle 14 mounted on the branch pipe 13 via the processing liquid supply pipe 12.

At this point, if the: major axis-to-minor axis ratio of the elliptical shape of the steel plate member 8 is less than 1:1, a curvature in the vicinity of the ridges 10b increases, making it difficult to collect foreign material with a relatively high specific gravity in the vicinity of the ridges 10b on both sides by the flow of the processing liquid 1 ejected from the processing liquid discharge nozzle 14 carry away the foreign material and having the foreign material flow from the vicinity of the ridge 10b. Consequently, a problem arises in that foreign material settles and accumulates in the vicinity of the ridges 10b on both sides. When a discharge pressure of the processing liquid discharge nozzle 14 is increased in order to prevent such a problem, another problem arises in that the processing liquid 1 discharged toward the inclined part 5 and the bottom surface 6 of the processing tank 2 gyrates upward as a turbulent flow and causes the foreign material to scatter.

In addition, if the major axis-to-minor axis ratio of the elliptical shape of the steel plate member 8 exceeds 8:1, an ejection flow of the processing liquid 1 ejected from the processing liquid discharge nozzle 14 diffuses, making it difficult to have foreign material with a relatively high specific gravity flow to a position of an ejection flow of the processing liquid 1 ejected from the processing liquid discharge nozzle 14 of the branch pipe 13 positioned on the upstream-side in the work-conveying direction. Consequently, a problem arises in that foreign material settles and accumulates midway. While installation intervals of the branch pipes 13 must be shortened in order to prevent such a problem, shortening the installation intervals increases the numbers of the branch pipes 13 and the processing liquid discharge nozzles 14, resulting in greater cost.

Furthermore, the height H of the steel plate member 8 is desirably equal to or shorter than one half of the minor axis for similar reasons as the major axis-to-minor axis ratio of the elliptical shape of the steel plate member 8. As for the elevation angle α of the processing liquid discharge nozzle 14, an elevation angle α that is less than 10° makes it difficult to have foreign material with a relatively high specific gravity flow towards the hopper 4. Consequently, a problem arises in that foreign material settles and accumulates. On the other hand, if the elevation angle α of the processing liquid discharge nozzle 14 exceeds 60°, a problem arises in that a turbulent flow is generated, causing the foreign material to gyrate upward and adhere to the work W.

Moreover, a discharge pressure and a discharge rate of the circulation pump 16 are to be appropriately set in consideration of the area sizes of the inclined part 5 and the bottom surface 6 of the processing tank 2, the shape of the steel plate member 8, the elevation angle α of the processing liquid discharge nozzle 14, the specific gravity of the foreign material, and the like. Intervals of the branch pipes 13 are to be appropriately set in consideration of the area sizes of the inclined part 5 and the bottom surface 6 of the processing tank 2, the shape of the steel plate member 8, the elevation angle α of the processing liquid discharge nozzle 14, the specific gravity of the foreign material, and the like, as well as the discharge pressure and the discharge rate of the circulation pump 16 set according thereto.

Figure 7:
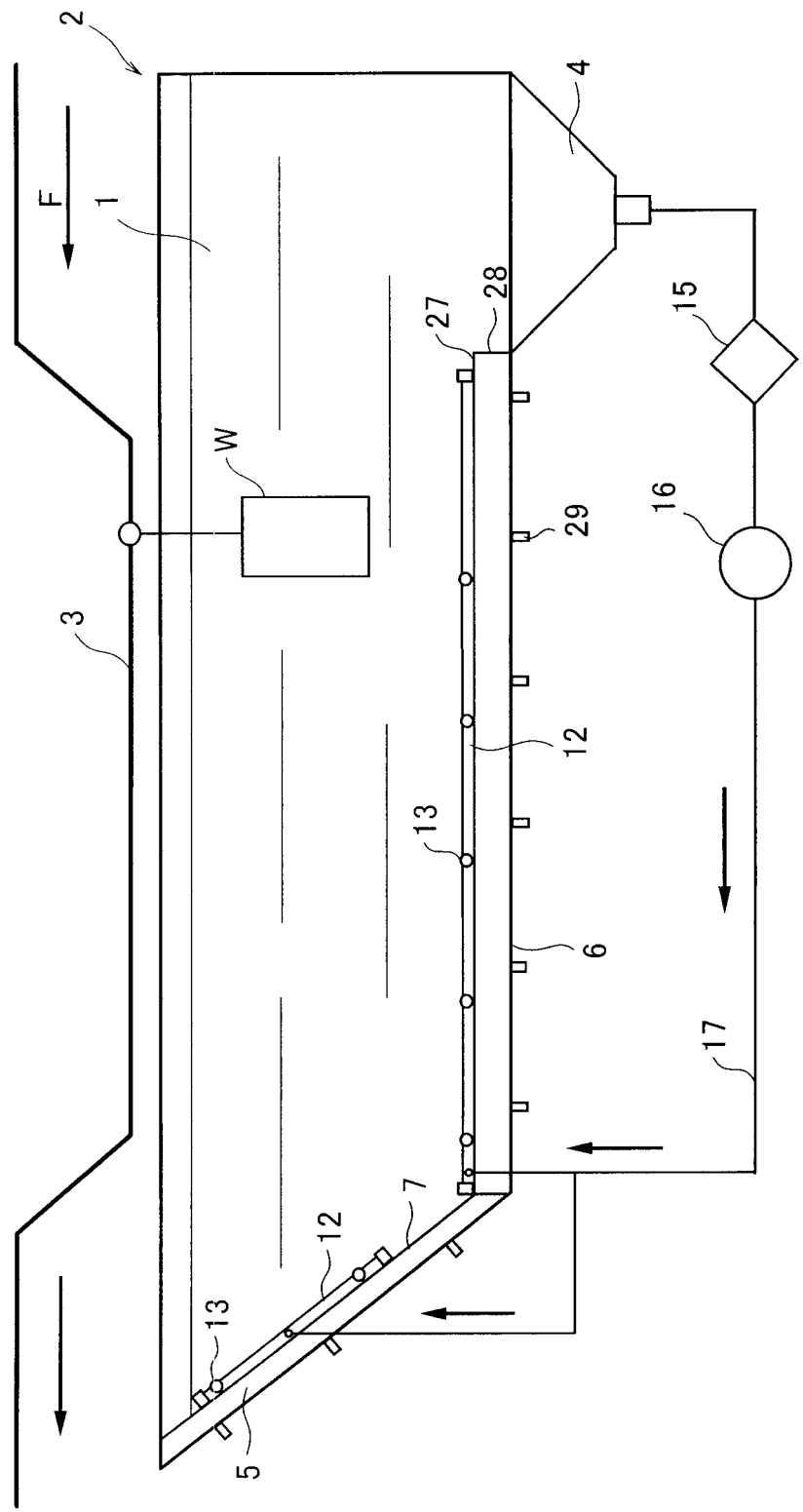
FIG. 7 is an explanatory diagram of a schematic configuration of a processing tank including a second embodiment of a device for removing foreign material from a processing tank according to the present invention.
Figure 8:
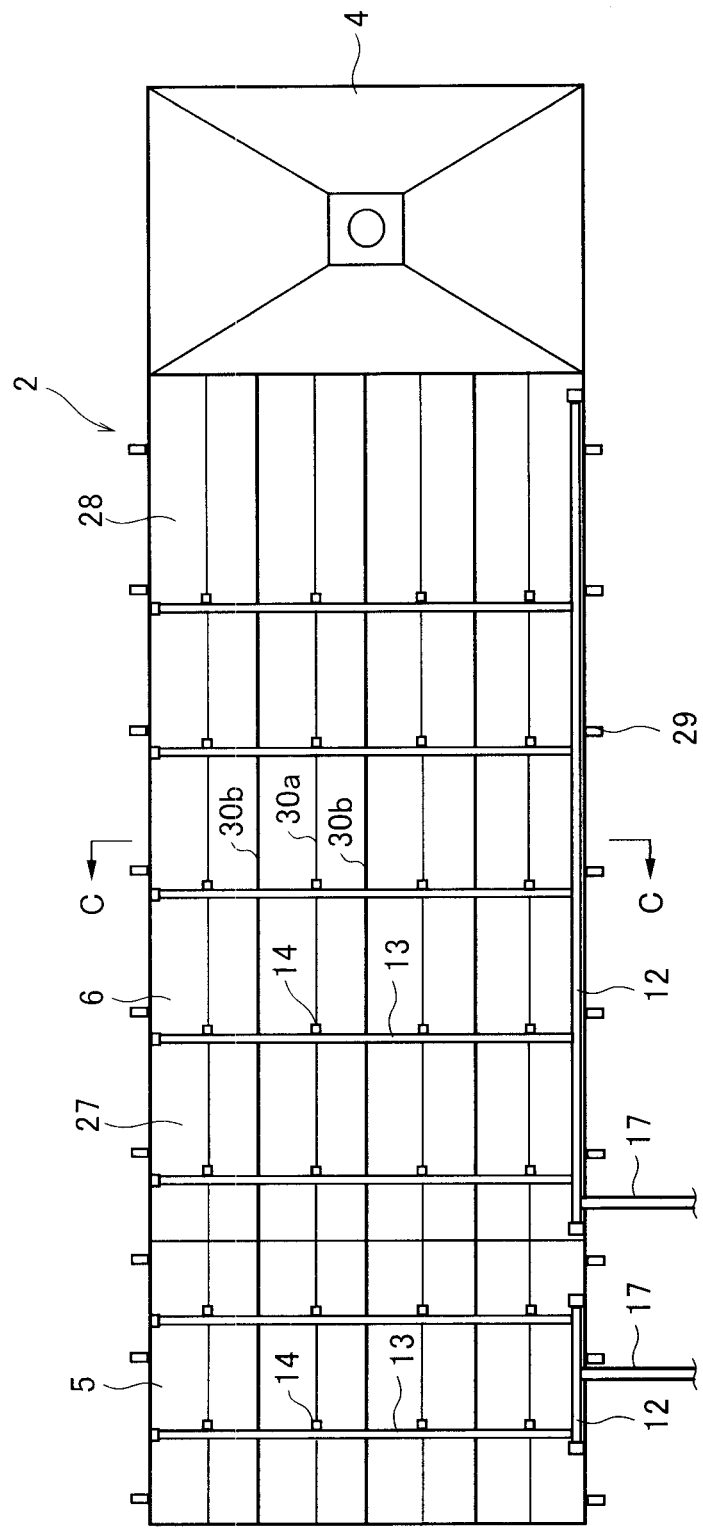
FIG. 8 is a plan view of the processing tank including the second embodiment of a device for removing foreign material from a processing tank according to the present invention.
Figure 9:
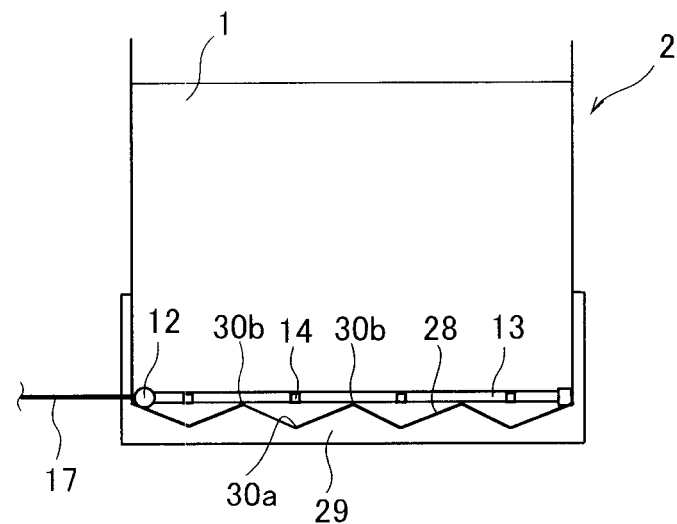
FIG. 9 is a cross-sectional fragmentary view taken along C-C in FIG. 8.
Figure 10:
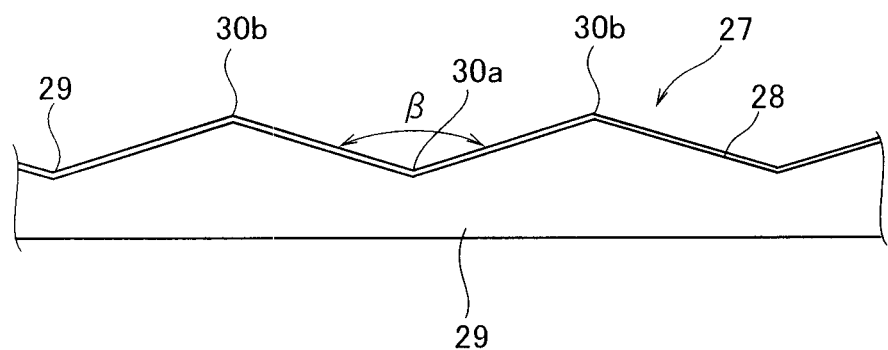
FIG. 10 is an enlarged view of a substantial part of FIG. 9.

Next, as illustrated in FIGS. 7 and 8, a second embodiment of the device for removing foreign material from a processing tank according to the present invention differs from the first embodiment in the shape of a grooved part 27 formed on an inclined part 5 and a bottom surface 6 of a processing tank 2. Otherwise, the configuration is the same as the first embodiment. As illustrated in FIG. 9, a cross section of the grooved part 27 is formed in a serrated shape. The grooved part 27 is formed by welding and bonding together a plurality of steel plate members 28 having a plurality of concave and convex shapes (a shape in which serrated shapes are arranged side by side) manufactured by press-molding, and reinforcing an outer frame of the welded and bonded steel plate members 28 with a reinforcing member 29. Concavities 30a of the grooved part 27 are valleys of the steel plate members 28, and convexities 30b of the grooved part 27 are ridges of the steel plate members 28. In addition, as illustrated in FIG. 10, an angle β of the valley 30a that constitutes the grooved part 27 is set so as to range between 90° and 165°.

Figure 11:
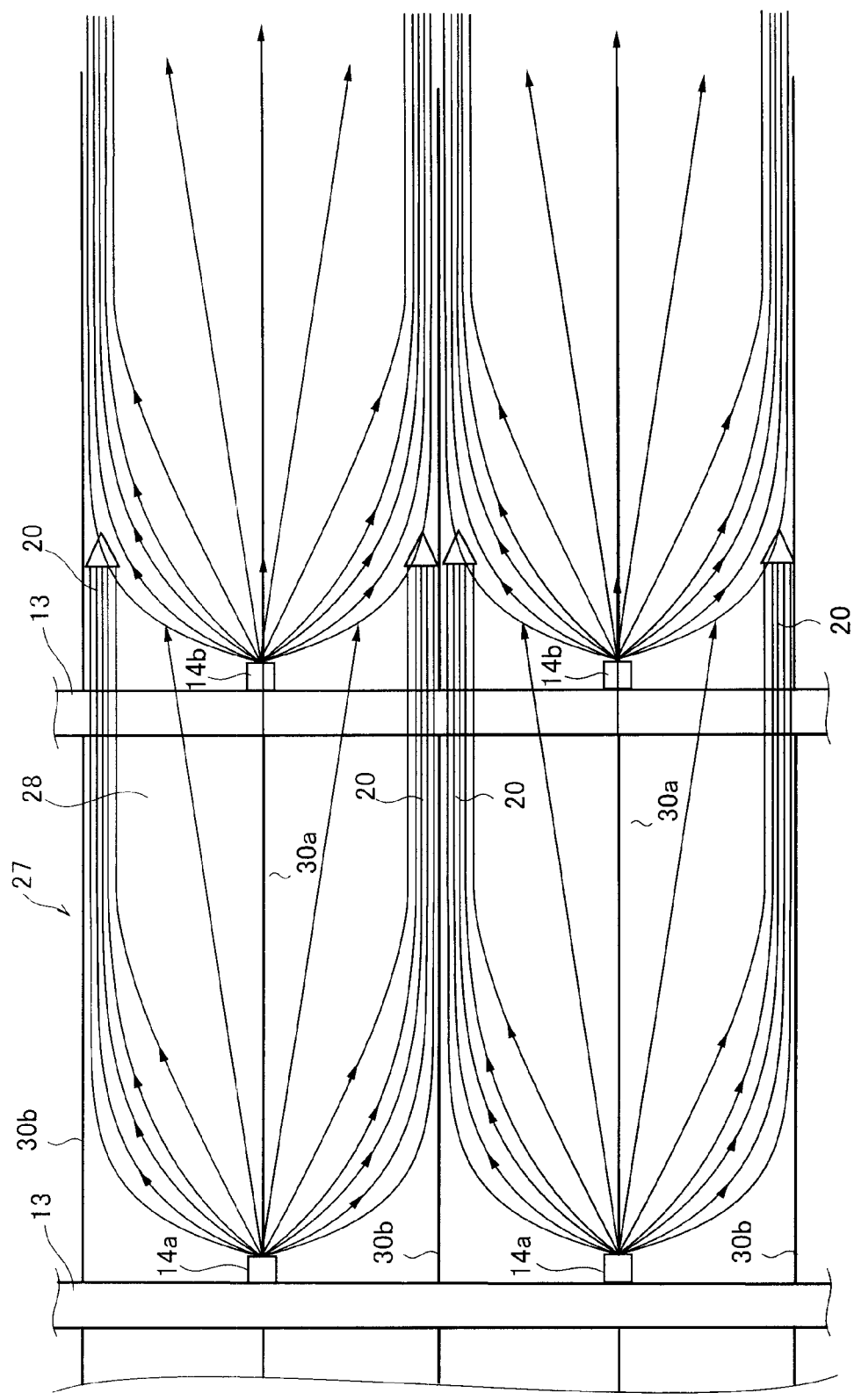
FIG. 11 is an explanatory diagram of operations of the second embodiment.

A description of operations of the second embodiment of the device for removing foreign material from a processing tank according to the present invention and configured as described above will now be given. As illustrated in FIG. 11, a processing liquid 1 ejected from a processing liquid discharge nozzle 14a of a branch pipe 13 positioned on a downstream-side in a work-conveying direction initially flows from the center of each valley 30a of the grooved part 27 to ridges 30b on both sides of the center of each valley 30a toward a hopper 4, then converges in a vicinity of the ridges 30b on both sides, becomes a strong flow 20 along the ridges 30b, and further flows toward the hopper 4.

The processing liquid 1 that flows toward the hopper 4 joins a flow of the processing liquid 1 ejected from a processing liquid discharge nozzle 14b of a branch pipe 13 positioned on an upstream-side of the aforementioned processing liquid discharge nozzle 14 in the work-conveying direction and further flows toward the hopper 4. At this point, foreign material with a relatively high specific gravity which naturally tends to settle and accumulate on the inclined part 5 and the bottom surface 6 of the processing tank 2 is carried by the flow of the processing liquid 1 ejected from the processing liquid discharge nozzle 14 and converges in a vicinity of the ridges 30b, consecutively flows toward the hopper 4, and is ultimately collected inside the hopper 4.

Next, foreign material collected in the hopper 4 is removed by a filter 15 when the processing liquid 1 suctioned by a circulation pump 16 returns to the processing tank 2 through a processing liquid circulation pipe 17. The processing liquid 1 with foreign material removed is once again ejected from the processing liquid discharge nozzle 14 mounted on the branch pipe 13 via the processing liquid supply pipe 12.

At this point, if the angle β of the valley 30a exceeds 165°, an incline from the valley 30a to the ridge 30b becomes gentler. Consequently, an ejection flow of the processing liquid 1 ejected from the processing liquid discharge nozzle 14 diffuses, making it difficult to have the processing liquid 1 carry away foreign material with a relatively high specific gravity to a position of an ejection flow of the processing liquid 1 ejected from the processing liquid discharge nozzle 14 of an adjacent branch pipe 13 and causing the foreign material to accumulate. In particular, it becomes difficult for ejection flows of the processing liquid 1 ejected from the processing liquid discharge nozzles 14 to converge and flow in the vicinity of the ridges 30b on both sides, creating a problem in that foreign material settles and accumulates in the vicinity of the ridges 30b on both sides.

When a discharge pressure of the processing liquid discharge nozzle 14 is increased in order to prevent such a problem, another problem arises in that the processing liquid 1 ejected toward the inclined part 5 and the bottom surface 6 gyrates upward as a turbulent flow and causes the foreign material to scatter. On the other hand, if the angle β of the valley 30a is less than 90°, an incline from the valley 30a to the ridge 30b becomes steep. Consequently, it becomes difficult for ejection flows of the processing liquid 1 ejected from the processing liquid discharge nozzles 14 to converge in the vicinity of the ridges 30b on both sides, creating a problem in that foreign material settles and accumulates in the vicinity of the ridges 30b on both sides. An angle β of less than 90° also reduces the intervals of the ridges 30b, causing an increase in the number of the processing liquid discharge nozzles 14 and resulting in greater cost.

In addition, as for the elevation angle α of the processing liquid discharge nozzle 14, an elevation angle α that is less than 10° makes it difficult to have foreign material with a relatively high specific gravity flow towards the hopper 4. Consequently, a problem arises in that foreign material settles and accumulates. On the other hand, if the elevation angle α of the processing liquid discharge nozzle 14 exceeds 60°, a problem arises in that a turbulent flow is generated, causing the foreign material to gyrate upward and adhere to the work W.

Moreover, a discharge pressure and a discharge rate of the circulation pump 16 are to be appropriately set in consideration of the area sizes of the inclined part 5 and the bottom surface 6 of the processing tank 2, the shape of the steel plate member 28, the elevation angle α of the processing liquid discharge nozzle 14, the specific gravity of the foreign material, and the like. Intervals of the branch pipes 13 are to be appropriately set in consideration of the area sizes of the inclined part 5 and the bottom surface 6 of the processing tank 2, the shape of the steel plate member 28, the elevation angle α of the processing liquid discharge nozzle 14, the specific gravity of the foreign material, and the like, as well as the discharge pressure and the discharge rate of the circulation pump 16 set according thereto.

Figure 12:
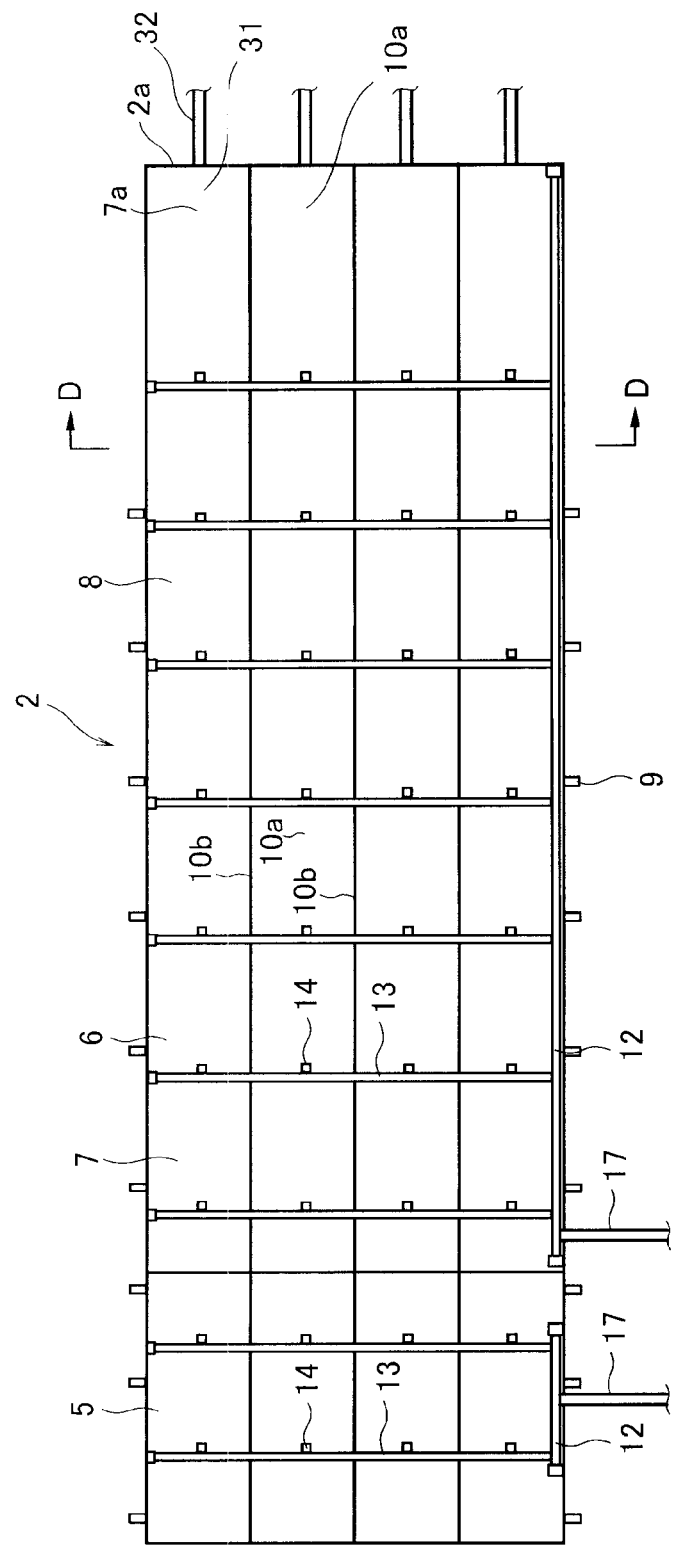
FIG. 12 is a plan view of a processing tank including a third embodiment of a device for removing foreign material from a processing tank according to the present invention.
Figure 13:
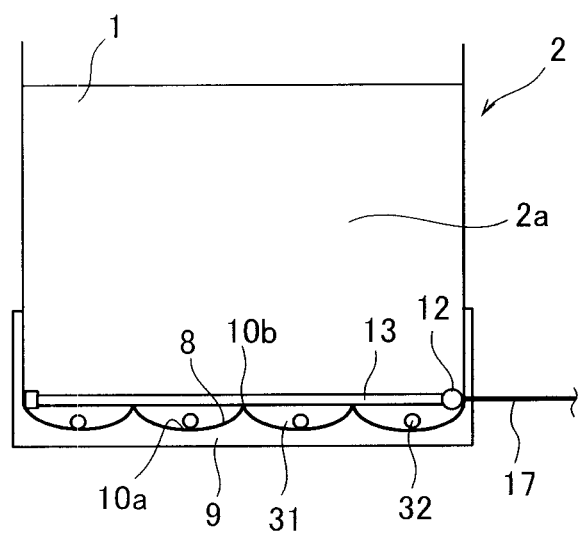
FIG. 13 is a cross-sectional fragmentary view taken along D-D in FIG. 12.

Next, as illustrated in FIGS. 12 and 13, in a third embodiment of the device for removing foreign material from a processing tank according to the present invention, the hopper 4 as a foreign material accumulation part in the first embodiment has been eliminated, the grooved part 7 has been extended to an end surface 2a of the processing tank 2, and a bottom part 10a of an end part 7a of the grooved part 7 is used as a foreign material accumulation part 31. Otherwise, the configuration is the same as the first embodiment. A discharge pipe 32 to be connected to a processing liquid circulation pipe 17 is mounted on an end surface 2a of the processing tank 2 opposing each bottom part 10a constituting the foreign material accumulation part 31 so as to communicate with each bottom part 10a.

Foreign material collected in the foreign material accumulation part 31 is removed by a filter 15 when the processing liquid 1 suctioned by a circulation pump 16 returns to the processing tank 2 through the processing liquid circulation pipe 17. The processing liquid 1 with foreign material removed is once again ejected from a processing liquid discharge nozzle 14 mounted on a branch pipe 13 via a processing liquid supply pipe 12. Otherwise, operations are the same as the first embodiment.

Moreover, the foreign material accumulation part 31 is not limited to the end part 7a of the grooved part 7. For example, the foreign material accumulation part 31 may be provided at the center in a work-conveying direction or at an appropriate position in the processing tank 2 and the discharge pipe 32 to be connected to the processing liquid circulation pipe 17 may be mounted on the foreign material accumulation part 31 so as to communicate with each bottom part 10a of the grooved part 7. In addition, a configuration may be adopted in which a hopper that is a foreign material accumulation part is arranged such that an upper opening of the hopper is positioned on the end surface 2a of the processing tank 2 near the bottom surface 6 and the processing liquid circulation pipe 17 is connected to a rear end of the hopper.

Figure 14:
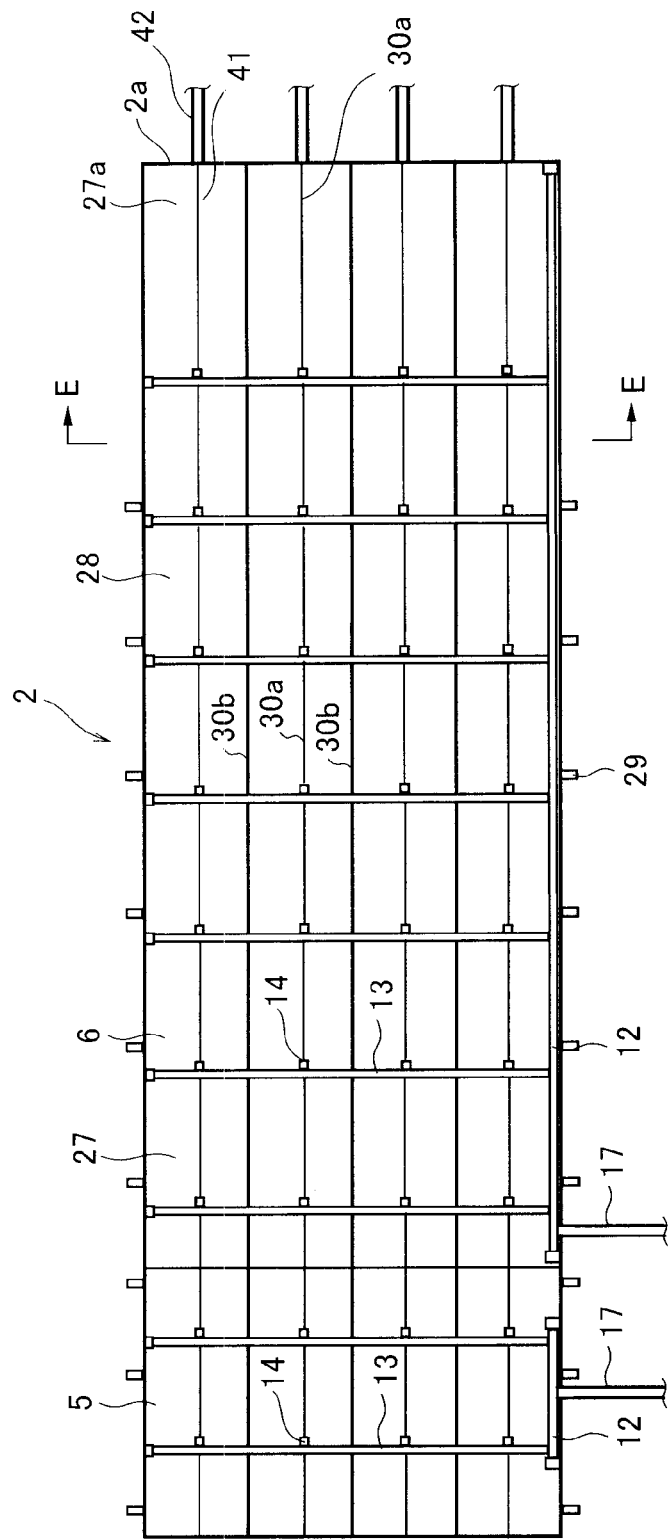
FIG. 14 is a plan view of a processing tank including a fourth embodiment of a device for removing foreign material from a processing tank according to the present invention.
Figure 15:
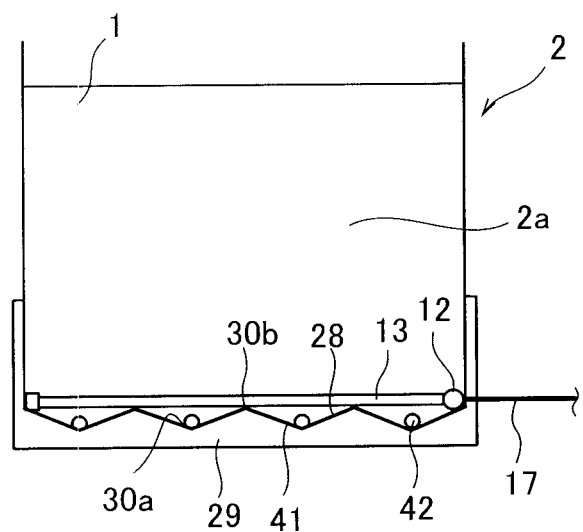
FIG. 15 is a cross-sectional fragmentary view taken along E-E in FIG. 14.

Next, as illustrated in FIGS. 14 and 15, in a fourth embodiment of the device for removing foreign material from a processing tank according to the present invention, the hopper 4 as a foreign material accumulation part in the second embodiment has been eliminated, the grooved part 27 has been extended to the end surface 2a of the processing tank 2, and a valley 30a of an end part 27a of the grooved part 27 is used as a foreign material accumulation part 41. Otherwise, the configuration is the same as the second embodiment. In addition, a discharge pipe 42 to be connected to a processing liquid circulation pipe 17 is mounted on an end surface 2a of the processing tank 2 opposing each valley 30a constituting the foreign material accumulation part 41 so as to communicate with each valley 30a.

Foreign material collected in the foreign material accumulation part 41 is removed by a filter 15 when a processing liquid 1 suctioned by a circulation pump 16 returns to the processing tank 2 through the processing liquid circulation pipe 17. The processing liquid 1 with foreign material removed is once again ejected from a processing liquid discharge nozzle 14 mounted on a branch pipe 13 via a processing liquid supply pipe 12. Otherwise, operations are the same as the second embodiment.

Moreover, the foreign material accumulation part 41 is not limited to the end part 27a of the grooved part 27. For example, the foreign material accumulation part 41 may be provided at the center in a work-conveying direction or at an appropriate position in the processing tank 2 and the discharge pipe 42 to be connected to the processing liquid circulation pipe 17 may be mounted on the foreign material accumulation part 41 so as to communicate with each valley 30a of the grooved part 27. In addition, a configuration may be adopted in which a hopper that is a foreign material accumulation part is arranged such that an upper opening of the hopper is positioned on the end surface 2a of the processing tank 2 near the bottom surface 6 and the processing liquid circulation pipe 17 is connected to a lower part of the hopper.

INDUSTRIAL APPLICABILITY

According to the present invention, a device for removing foreign material from a processing tank can be provided which is capable of removing even foreign material with a relatively high specific gravity which naturally tends to settle and accumulate in a processing tank by having a flow of a processing liquid ejected from a processing liquid discharge nozzle carry the foreign material toward a foreign material accumulation part and having the foreign material accumulation part collect the foreign material.

The invention claimed is:

1. A device for removing, from a processing tank, foreign material introduced into the processing tank by detaching from a work when the work, which is suspended and transported by a conveyer, is immersed in a processing liquid held in the processing tank and given a processing, the device comprising:
   a grooved part having a plurality of concave and convex shapes formed along a work-conveying direction on at least a bottom surface of the processing tank;
   a foreign material accumulation part provided in the processing tank;
   a processing liquid supply pipe which supplies the processing liquid circulating through the foreign material accumulation part to the processing tank;
   a plurality of branch pipes branched to intersect to a work conveying direction from the processing liquid supply pipe and abuttingly supported on convexities of the grooved part; and
   processing liquid discharge nozzles provided so as to face the foreign material accumulation part at a center of concavities of the grooved part, and
   wherein, the concave and convex shapes of the grooved part are defined by a cross section of the grooved part being formed by a portion of an elliptical shape whose major axis is positioned in a width direction of the processing tank and whose minor axis is positioned in a height direction of the processing tank and which has a major axis-to-minor axis ratio ranging from 1:1 to 8:1, or being formed in a serrated shape with concavities of the grooved part being valleys and convexities of the grooved part being ridges, and wherein an angle of the valley is within a range between 90° and 165°.

2. The device for removing foreign material from a processing tank according to claim 1, wherein the grooved part is formed by arranging, side by side, steel plate members having gutter shapes, the concavities are bottom parts of the steel plate members, and the convexities are ridges of the steel plate members.

3. The device for removing foreign material from a processing tank according to claim 1, wherein the grooved part is formed by arranging, side by side, steel plate members having serrated shapes, the concavities are valleys of the steel plate members, and the convexities are ridges of the steel plate members.

4. The device for removing foreign material from a processing tank according to claim 1, wherein the foreign material accumulation part is one of a hopper provided on an end of the grooved part, the bottom parts of the steel plate members, and the valleys of the steel plate members.

5. The device for removing foreign material from a processing tank according to claim 2, wherein the foreign material accumulation part is one of a hopper provided on an end of the grooved part, the bottom parts of the steel plate members, and the valleys of the steel plate members.

6. The device for removing foreign material from a processing tank according to claim 3, wherein the foreign material accumulation part is one of a hopper provided on an end of the grooved part, the bottom parts of the steel plate members, and the valleys of the steel plate members.

* * * * *